US012281925B2

(12) United States Patent
Vago et al.

(10) Patent No.: US 12,281,925 B2
(45) Date of Patent: Apr. 22, 2025

(54) PRESSURE SENSOR EMBEDDED IN A METERING DEVICE

(71) Applicant: Itron Global SARL, Liberty Lake, WA (US)

(72) Inventors: Stephane Vago, Pont de L Isere (FR); Vincent Mosser, Le Plessis-Robinson (FR); Arnaud Darras, Saint Germain au Mont d'Or (FR); Gregory Pastor, Massy (FR)

(73) Assignee: Itron Global SARL, Liberty Lake, WA (US)

( * ) Notice: Subject to any disclaimer, the term of this patent is extended or adjusted under 35 U.S.C. 154(b) by 403 days.

(21) Appl. No.: 17/829,162

(22) Filed: May 31, 2022

(65) Prior Publication Data

US 2023/0384136 A1  Nov. 30, 2023

(51) Int. Cl.
  *G01F 1/86* (2006.01)
  *G01M 3/26* (2006.01)

(52) U.S. Cl.
  CPC ............... *G01F 1/86* (2013.01); *G01M 3/26* (2013.01)

(58) Field of Classification Search
  None
  See application file for complete search history.

(56) References Cited

U.S. PATENT DOCUMENTS

| 7,096,738 | B2 | 8/2006 | Schumacher | |
| 9,389,108 | B2 * | 7/2016 | Gottlieb | G01F 1/66 |
| 11,150,154 | B2 | 10/2021 | Krywyj et al. | |
| 2011/0132103 | A1 * | 6/2011 | Gottlieb | G01F 1/662 |
| | | | | 73/861.28 |
| 2011/0162461 | A1 * | 7/2011 | Allen | G01F 1/662 |
| | | | | 310/317 |
| 2015/0308870 | A1 * | 10/2015 | Gottlieb | E21B 47/10 |
| | | | | 73/861.28 |

FOREIGN PATENT DOCUMENTS

WO   WO2009/145634 A1   12/2009

OTHER PUBLICATIONS

The PCT Search Report and Written Opinion mailed Jun. 13, 2023 for PCT application No. PCT/US23/14745, 22 pgs.

* cited by examiner

*Primary Examiner* — Raul J Rios Russo
*Assistant Examiner* — Carl F. R. Tchatchouang
(74) *Attorney, Agent, or Firm* — Lee & Hayes, P.C.

(57) ABSTRACT

An example pressure-sensing device includes a pipe or conduit having upstream and downstream connectors for respective upstream and downstream transducers to measure fluid (e.g., water) flow. The conduit may be made at least in part of a resiliently deformable material. A deformable electrode of a capacitor may be mounted in contact with a dry-side surface of an area of the resiliently deformable material. The wet-side surface of the area may define part of a pathway for a flow of the fluid. In operation, the area of the resiliently deformable material changes a location and/or a shape of the deformable electrode in response to changes in fluid pressure. A fixed electrode of the capacitor is separated by a dielectric material (e.g., air or an insulator) from the deformable electrode, and a circuit determines a pressure of the fluid based at least in part on a capacitance between the deformable electrode and the fixed electrode.

20 Claims, 10 Drawing Sheets

508
GENERATE AN OUTPUT SIGNAL, WHEREIN THE OUTPUT SIGNAL IS BASED AT LEAST IN PART ON A CAPACITANCE OF THE CAPACITOR

600
GENERATE THE OUTPUT SIGNAL BY OPERATION OF A CIRCUIT (E.G., A UNIPOLAR ASTABLE MULTIVIBRATOR CIRCUIT)

602
RECEIVE, AT A CIRCUIT (E.G., A UNIPOLAR ASTABLE MULTIVIBRATOR CIRCUIT), A FIRST LEAD FROM A DEFORMABLE ELECTRODE OF THE CAPACITOR AND A SECOND LEAD FROM A FIXED-LOCATION ELECTRODE OF THE CAPACITOR, WHEREIN NEITHER OF THE FIRST LEAD AND SECOND LEAD PASSES THROUGH THE RESILIENTLY DEFORMABLE MATERIAL

FIG. 6

PRESSURE SENSOR EMBEDDED IN A METERING DEVICE

BACKGROUND

Pressure sensors to measure the water pressure in a utility are known. However, known pressure sensors have introduced problems when integrated into water meters, including water leaks, excessive costs, and/or excessive power consumption. Accordingly, improved pressure sensors for metering devices would be welcomed by the industry.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

FIGS. 6-8 are flow diagram fragments, showing example detail of portions of the flow diagram of FIG. 5.

DETAILED DESCRIPTION

Overview

Figure 1:
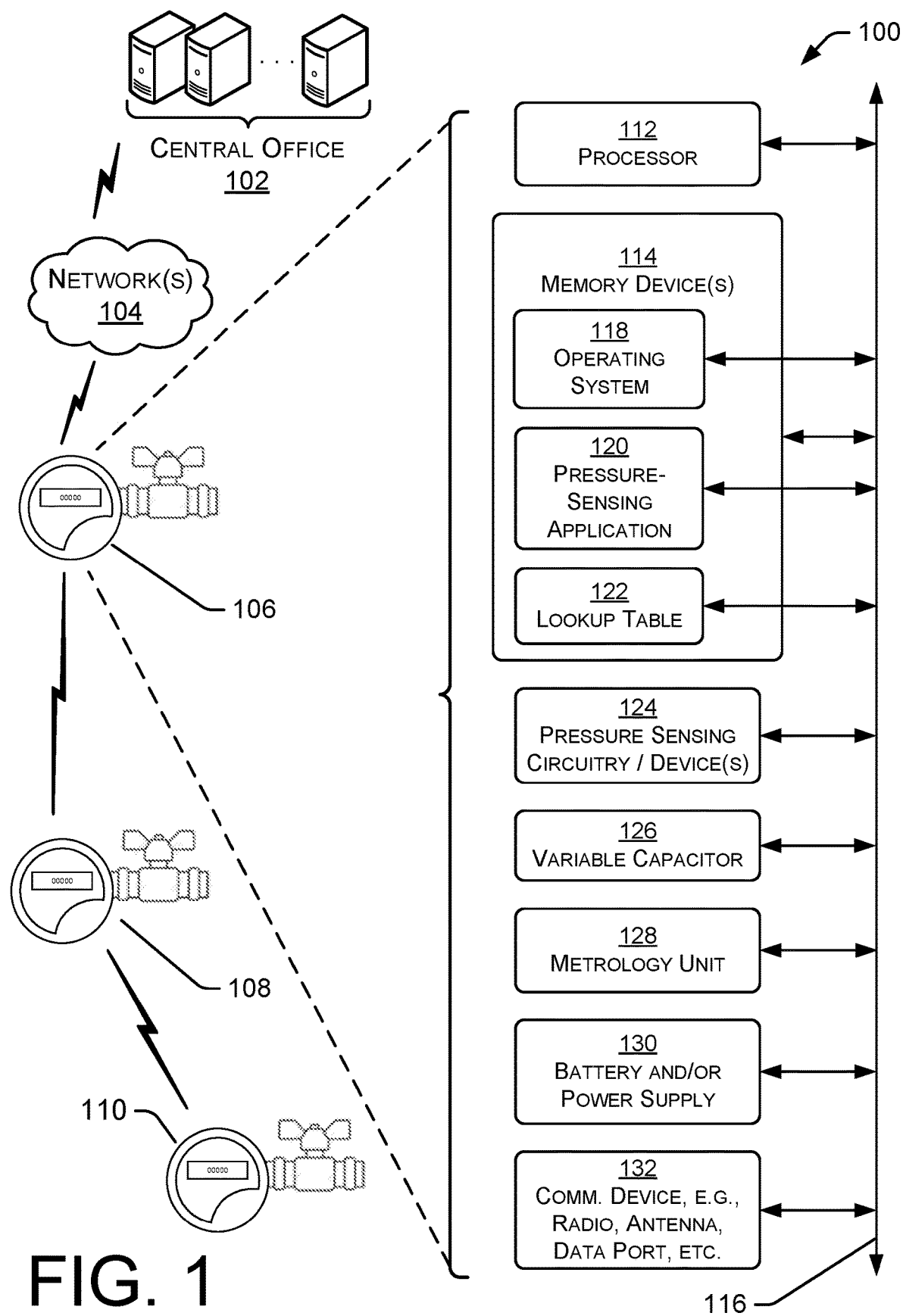
FIG. 1 is a schematic diagram showing a water system, including water meters with an embedded pressure sensor associated with an internal metering device.

The disclosure describes components and operating techniques for fluid pressure sensing, such as for use in a water meter, gas meter, steam meter, or other pressure-measuring and/or fluid-handling device. In an example of a static water meter, a metrology device includes a pipe or conduit having upstream and downstream connectors for respective upstream and downstream transducers to measure water flow. The static (i.e., no moving parts) meter measures a water flowrate based on the difference in speed between upstream and downstream acoustic signals in the water flow. The disclosure is also adapted for use with a mechanical water meter or other device (e.g., pumping device or valve, etc.) in a fluid (water, gas, steam, etc.) network and/or supply system. Additionally, while the disclosure describes the use of a resiliently deformable material to mount an electrode of a capacitor, in an alternative a hole within the pipe or conduit may be used to communicate with a capacitor that is within the fluid flow. This alternative arrangement of components may result in different costs and/or design advantages and disadvantages.

The conduit may include an area made of a resiliently deformable material. A resiliently deformable and/or movable electrode of a capacitor may be mounted in contact with a dry-side surface of the area of the resiliently deformable material. A wet-side surface of the area of resiliently deformable material may define part of a pathway within the conduit for a flow of the fluid. In operation, changes in fluid (e.g., water) pressure against the area of the resiliently deformable material changes a location and/or a shape of the deformable electrode. In an example, higher fluid pressure will push the deformable and/or moveable electrode (i.e., a capacitor plate) closer to a fixed location electrode, thereby increasing the capacitance between the electrodes. Accordingly, the capacitor is a variable capacitor, having a variability that is based at least in part on a pressure of the fluid (e.g., the pressure of water passing through the conduit of the water meter). In an example, the fixed electrode of the capacitor is separated by a dielectric from the deformable electrode. In the example, a thickness of the electrically insulating dielectric material (dry air, electrical insulator, vacuum, etc.) changes as a function of water pressure.

A circuit to which the variable capacitor is attached may be configured to determine a pressure of the fluid based at least in part on a capacitance between the deformable electrode and the fixed electrode. In an example, a unipolar astable multivibrator circuit may be attached to the variable capacitor. The circuit may create an output signal, which may be sent to a processor (e.g., a micro-controller, microprocessor, application specific integrated circuit, etc.). The processor may be configured to count the pulses of the output signal over time and obtain a value of the frequency of the output signal. The frequency may be mapped to a value of the fluid pressure. The mapping may be performed by accessing a lookup table, evaluating a polynomial or formula, or other technique as indicated by design requirements.

Example System and Techniques

FIG. 1 shows an example water system 100. The water system is representative of fluid transfer systems generally, additionally including gas, steam, and others. In the example system 100, a central office 102 communicates over networks 104 with a plurality of water meters 106-110. The central office 102 may include one or more computers, servers, memory devices, etc. The network(s) 104 may utilize one or more technologies or standards, including those related to public carriers, private systems, commercial cellular systems, radio frequency (RF) systems, or other technologies. In an example, the network(s) 104 may include the internet. The network(s) 104 may be used to transmit consumption data from the plurality of water meters to the central office 102. Other data, such as software updates, requests for consumption data, and other data may be sent over the network(s) 104. Additionally, requests for, and/or responses including, water pressure information may be sent over the network. In an example, water pressure information may be obtained by one or more of the water meters 106-110 and may be sent to the central office 102 over the network(s) 104.

The water meters 106-110 are representative of water meters in the water system 100, which may include thousands of water meters. In an example, meters may include a pressure sensor to measure water pressure at each respective meter's location. Water meter 106 is representative of meters having a pressure sensor. A processor 112 may be a microprocessor, microcontroller, application specific integrated circuit (ASIC), or other processing device. The processor 112 may communicate with memory device(s) 114 over a bus 116, wiring, printed circuit card, or other connectivity device. The memory device 114 may include an operating system 118, including appropriate drivers, low-level programs, and other routines, objects, data, and software in a known manner.

A pressure-sensing application 120 may perform functions such as determining a frequency of the output signal that is output from a pressure sensing circuit 124 (e.g., the astable multivibrator circuit of FIG. 4) and associated variable capacitor 126, mapping the frequency of the signal to a fluid pressure value (e.g., by accessing a lookup table 122 as described in one or more of FIGS. 5 through 8), etc.

A metrology unit 128 may measure fluid consumption, such as for purposes of billing, identification of fluid leaks, for use by fluid conservation programs, etc. Example static metrology devices are described with respect to FIGS. 2 and 3. A battery and/or power supply 130 may be used to power the water meter 106. A communications device 132, may include one or more of a radio, an antenna, a powerline communications modem, a data port, or user interface (e.g., for manual meter reading) etc.

Figure 2:
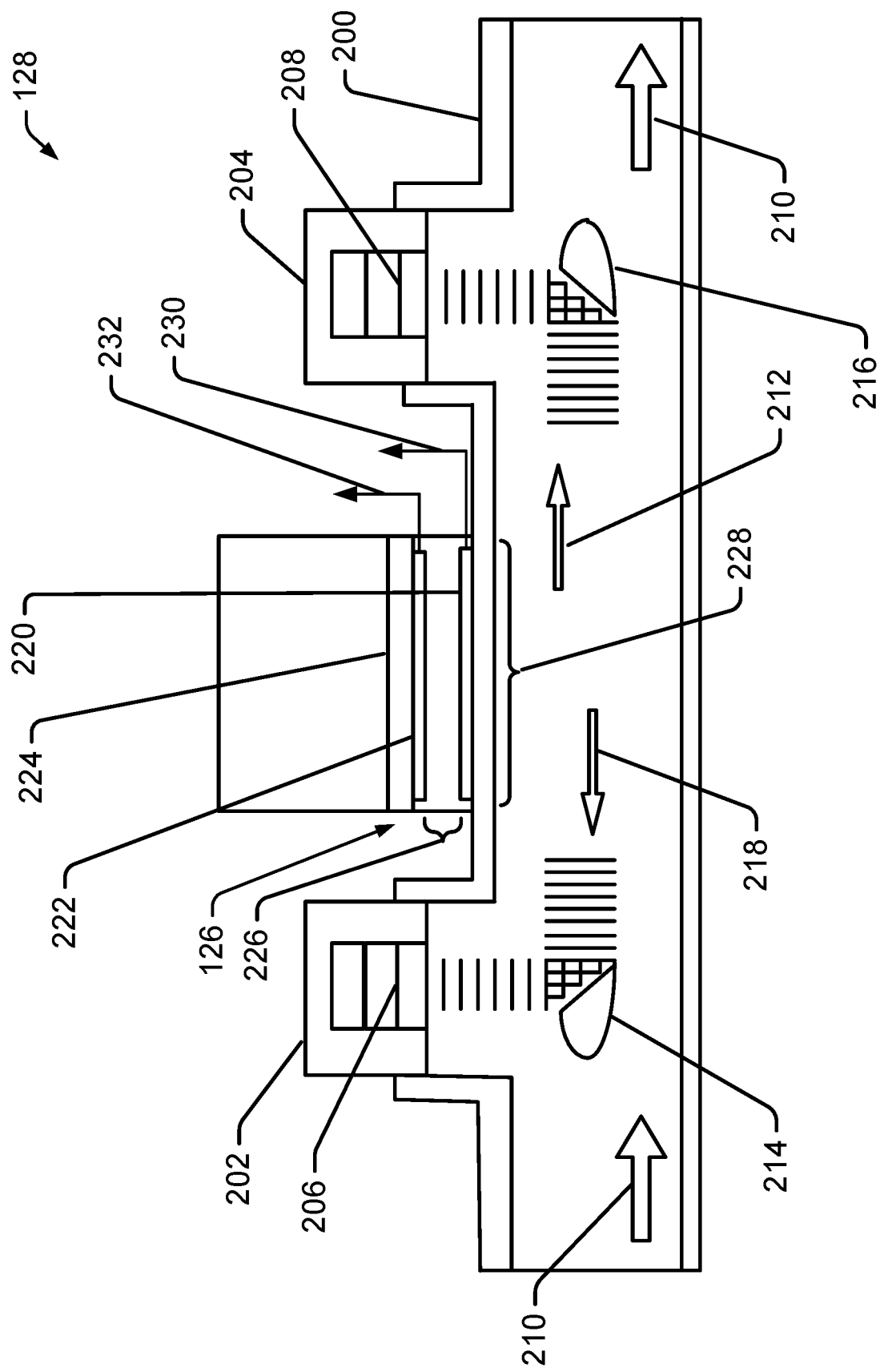
FIG. 2 is a diagram showing an example pressure sensor within a fluid meter, wherein the pressure sensor is measuring lower-pressure fluid.

FIG. 2 shows an example metrology unit 128 of a water meter that is configured to measure flowrate and fluid pressure. The metrology unit 128 includes a length of conduit 200 with an upstream connector 202 and a downstream connector 204 to secure an upstream transducer 206 and a downstream transducer 208, respectively. The transducers measure a flowrate of a water flow 210 (moving left to right, in the example). In the example, the upstream transducer 206 sends a signal 212 that reflects off an upstream mirror 214, and moves a fixed and known distance, and then reflects off a downstream mirror 216 and is detected by the downstream transducer 208. Similarly, the downstream transducer 208 sends a signal 218 that reflects off the downstream mirror 216, and moves the fixed and known distance, and then reflects off the upstream mirror 214 and is detected by the upstream transducer 206. A calculation using the time-of-flight of the signal 212 moving downstream and the time-of-flight of the signal 218 upstream is performed, thereby determining the flowrate of the fluid flow 210.

A variable capacitor 126 is connected to, or is located adjacent to, the conduit 200. In an example, the variable capacitor 126 includes a deformable electrode 220 and a fixed electrode 222. The two electrodes are separated by a dielectric 226, which in some examples and/or implementations has a variable thickness. In typical examples, the "fixed" electrode is fixed in location and/or shape. The fixed electrode 222 may be fixed in a planar form and supported by a rigid backing material 224, such as rigid plastic, resin, or metal or other suitable material.

In an example, a change in the location and/or shape of the deformable electrode 220 changes a thickness of the dielectric 226 and/or a distance of separation between the two electrodes. In examples, the dielectric 226 could be dry air, a compressible foam, certain conventional dielectric materials, a vacuum, or other electrical insulators and/or other materials. Because of the deformable nature of the deformable electrode 220, the distance between the two electrodes 220, 222 changes in response to changes in water pressure. And because distance changes, the capacitance of the variable capacitor 126 changes.

In an example of increasing water pressure, the higher water pressure may push the deformable electrode 220 closer to the fixed electrode 222, thereby increasing the capacitance of the variable capacitor 126. (This is seen by comparing FIGS. 2 and 3.) In an example of decreasing water pressure, lower water pressure may result in an increase in distance of the deformable electrode 220 from to the fixed electrode 222, thereby decreasing the capacitance of the variable capacitor 126.

In operation, the pressure of fluid (e.g., water) moving in the conduit pushes against an area 228 of the conduit that is formed of a resiliently deformable material. The pressure changes the location of—and/or changes a shape of—the deformable electrode 220. Due to the changing spatial relationship of the deformable electrode 220 and the fixed electrode 222 the capacitance of a variable capacitor 126 is changed. Different values of capacitance can be mapped to different water pressure values.

Figure 2A:
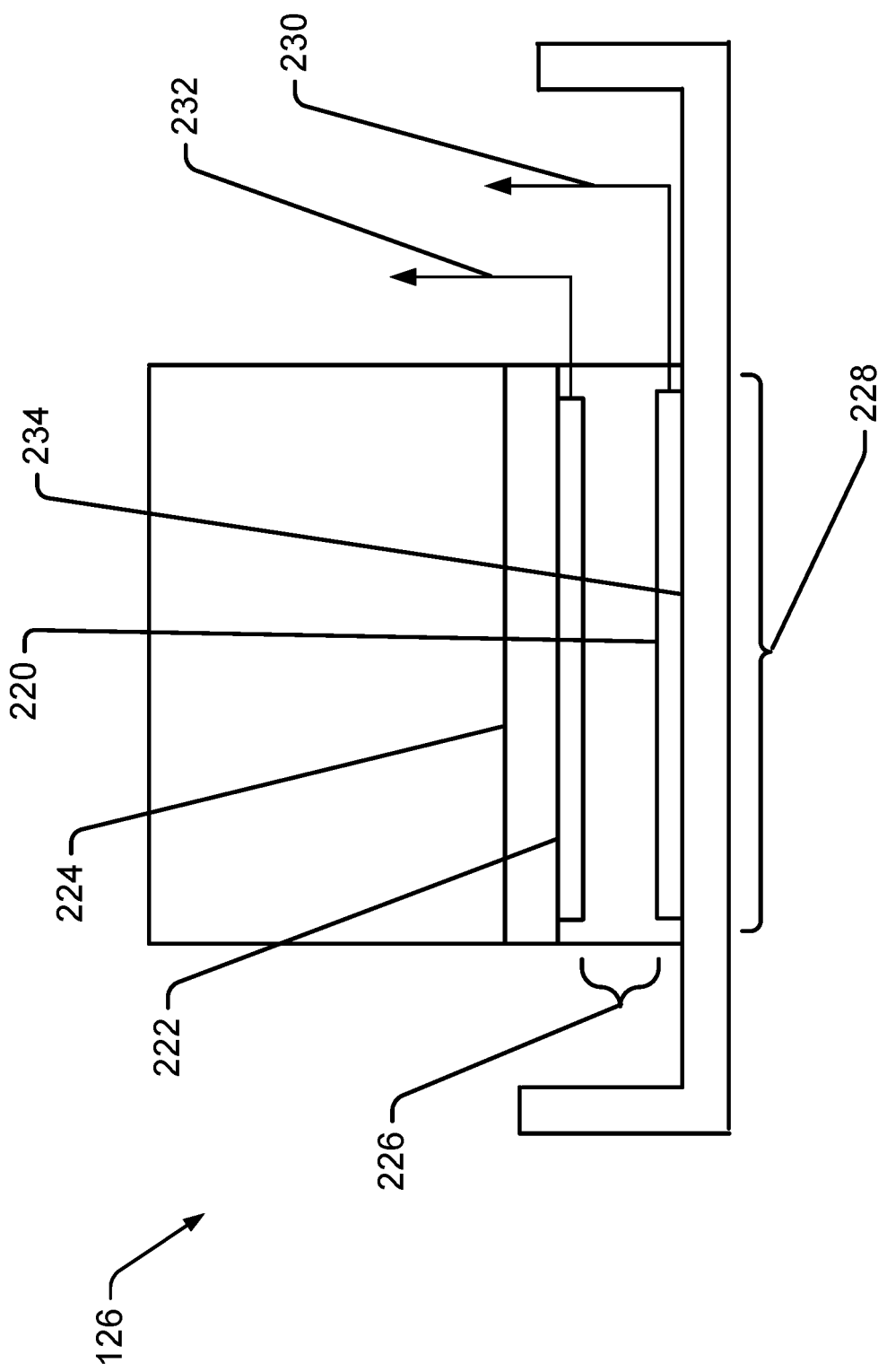
FIG. 2A is an enlarged portion of the diagram of FIG. 2, showing pressure sensor measuring lower water pressure.

The enlarged view of FIG. 2A, shows an example configuration of the variable capacitor 126 embedded in a metering device in conditions of low pressure, wherein the water pressure has not exerted enough force on the inside surfaces of the conduit 200 to push the deformable electrode 220 closer to the fixed electrode 222. That is, the area 228 of deformable material is not deformed, and the variable capacitor 126 is configured to have a minimal level of capacitance. Accordingly, FIG. 2A shows a configuration associated with a minimal value of pressure that can be measured.

In FIG. 2A, the deformable electrode 220 is attached to a dry-side surface 234 of an area 228 of resiliently deformable material of the conduit 200. The area 228 of resiliently deformable material is characterized by its flexibility in response to changes in water pressure. Responsive to water pressure, the resiliently deformable material may be stretched, pushed, or otherwise relocated, thereby allowing changes in water pressure to result in changes in a shape and/or location of the deformable electrode 220 with respect to the fixed electrode 222. Advantageously, the area 228 of resiliently deformable material does not have any holes, pass-throughs, gaskets, seals, and/or any other structures which may cause leaks over time.

A wire 230 (or similar conductor) is connected to the deformable electrode 220 and a wire 232 (or similar conductor) is connected to the fixed electrode 222. The wires 230, 232 of the capacitor 126 may be connected to a circuit that produces an output signal that is based at least in part on the capacitance of the variable capacitor 126.

In an example, the area 228 of resiliently deformably material may not be conductive (e.g., if it is made of a polymer, etc.). However, the deformable electrode 220 may be applied to the area 228 of resiliently deformable material by any appropriate technique, such as metallic deposition, painting processes, ink jet, etc. Where the deformable electrode 220 is a sheet material, it may be applied and/or secured to the area 228 of resiliently deformable material by use of adhesive materials.

Figure 3:
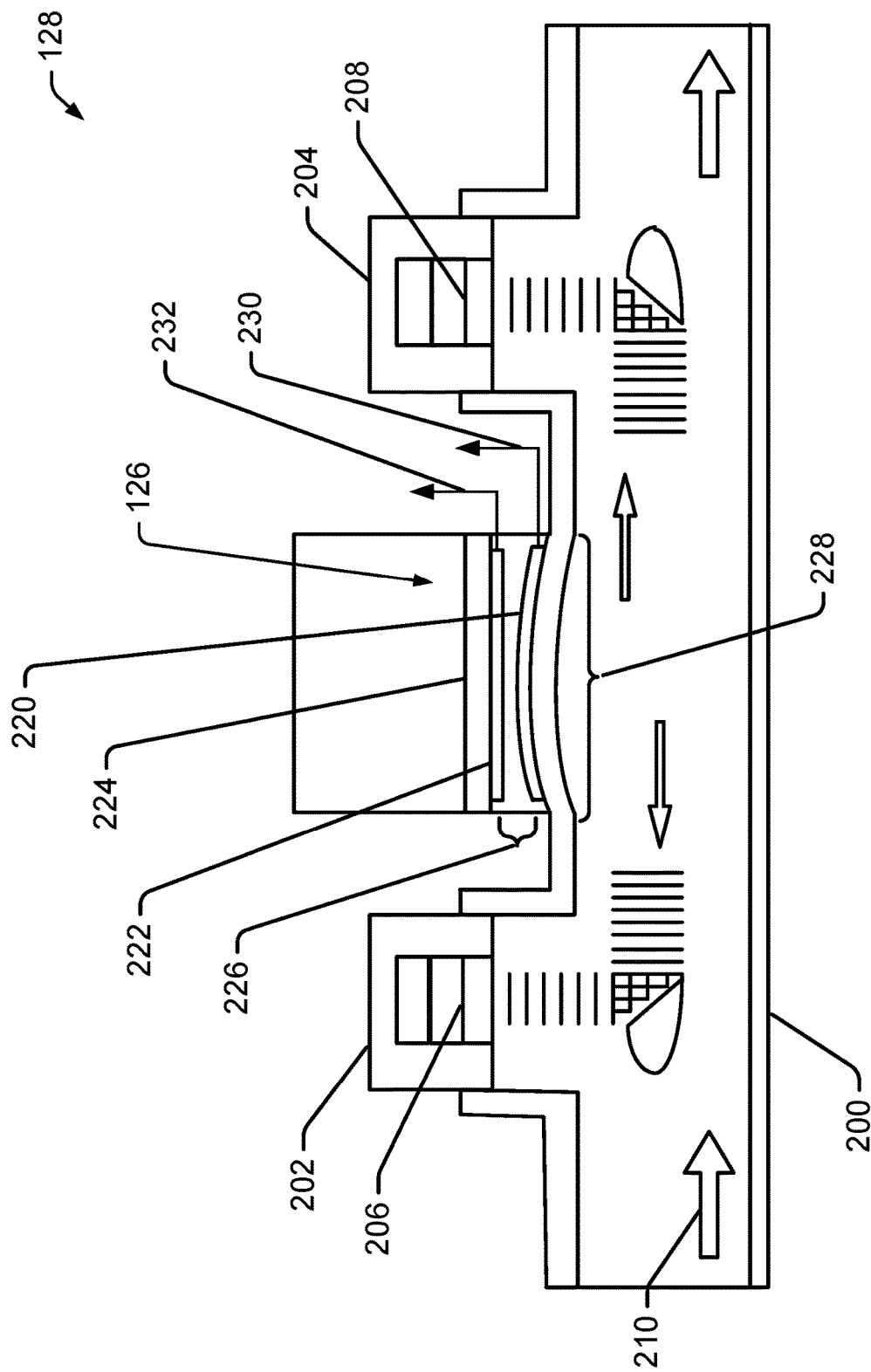
FIG. 3 is a diagram showing the example pressure sensor measuring higher-pressure fluid, wherein a comparison of FIGS. 2 and 3 show features of the example construction and operation of the pressure sensor.

FIG. 3 shows the example metrology unit 128 of a water meter configured to measure flowrate and fluid pressure in a circumstance wherein a pressure of the water is higher than the water pressure seen in FIG. 2. Accordingly, a comparison of FIGS. 2 and 3 show that the area 228 of resiliently deformable material is flexed, arched and/or deformed in a manner that moves the deformable electrode 220 to a position that is nearer the fixed electrode 222 than it was in the view of FIG. 2. Because the electrodes are closer together, the capacitance of the variable capacitor is greater, and will result in an increased frequency of the output signal from a circuit that produces an output signal that is based at least in part on the variable capacitor, such as the unipolar astable multivibrator circuit 400 of FIG. 4.

Figure 3A:
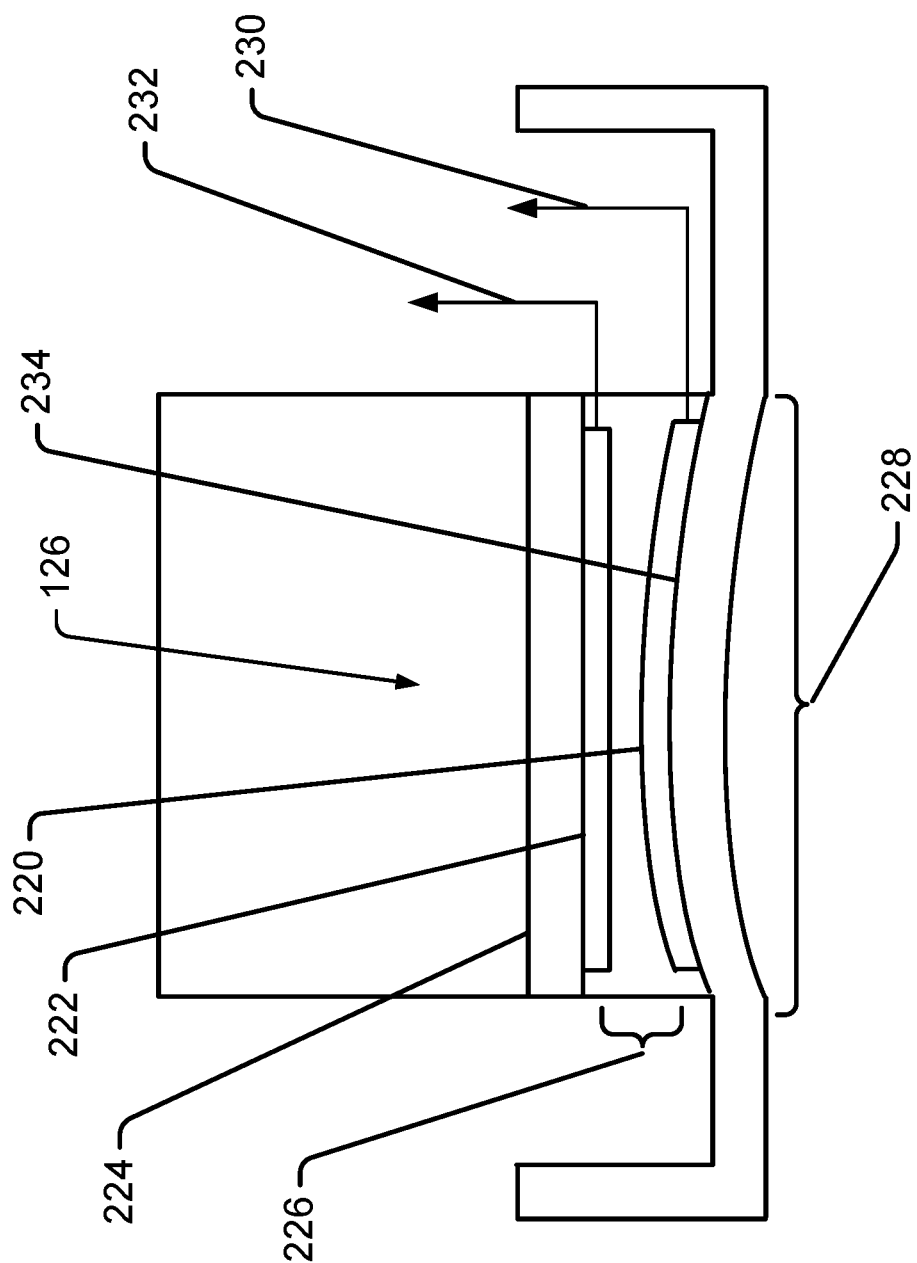
FIG. 3A is an enlarged portion of the diagram of FIG. 3, showing pressure sensor measuring higher water pressure.

FIG. 3A shows an enlarged view of the area 228 of resiliently deformable material having been pushed upwardly, thereby moving the deformable electrode 220 to a position that is nearer the fixed electrode 222. The region of dielectric 226 is reduced, in response to movement of the deformable electrode 220. Accordingly, a value of the capacitance of the variable capacitor 126 is increased.

Figure 3B:
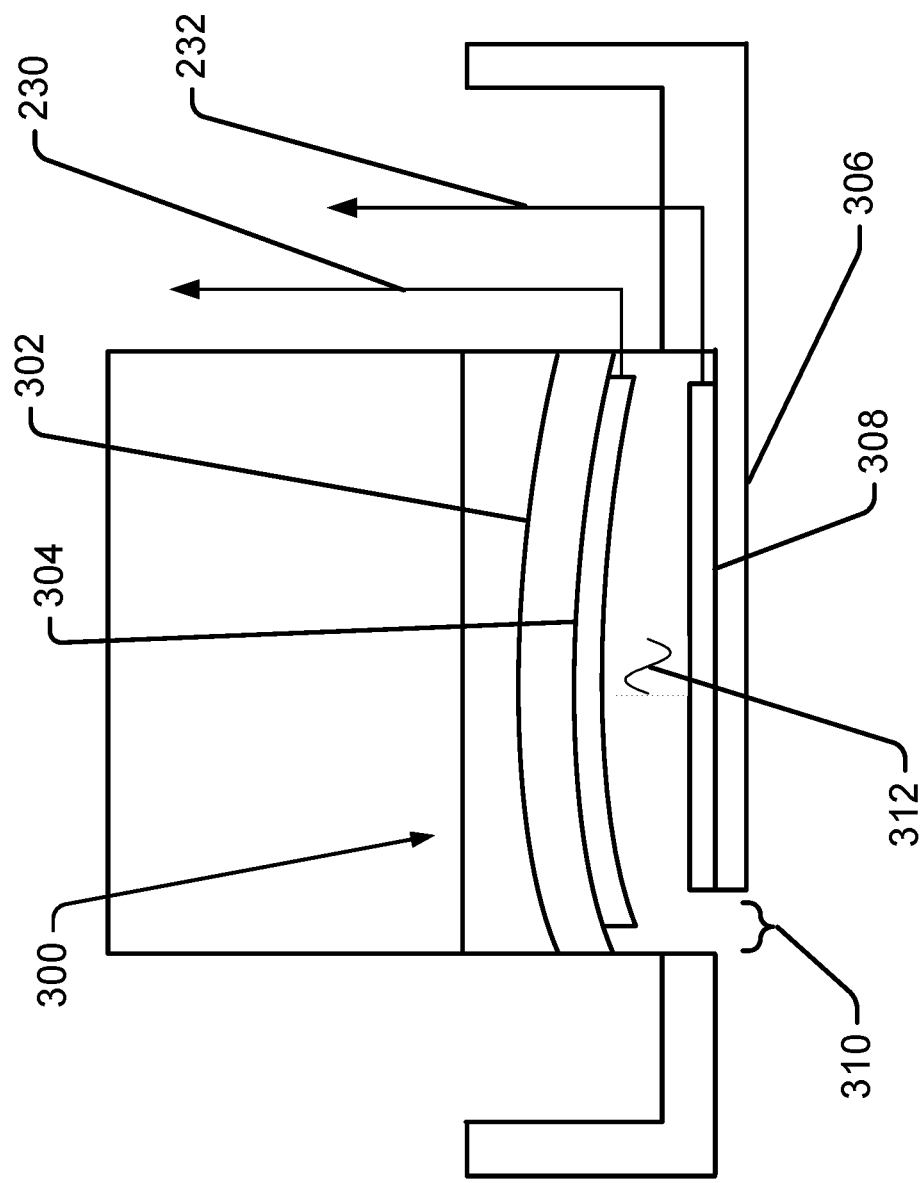
FIG. 3B shows a version of a pressure sensor having a design wherein increasing water pressure increases a distance between the electrodes or plates of the variable capacitor, thereby decreasing capacitance.

FIG. 3B shows a variable capacitor 300 that is configured to decrease in capacitance as the fluid pressure increases, and increase in capacitance as the fluid pressure decreases. Unlike the version of the variable capacitor of FIGS. 3 and 3A, the capacitance of the variable capacitor 300 varies inversely with the fluid pressure. The variable capacitor 300 may include an area 302 of the conduit that is formed of a resiliently deformable material, and supports a deformable electrode 304. A second area 306 of the conduit is formed of a rigid material, and supports a fixed electrode 308. A passage 310 allows fluid within an area 312 between the deformable electrode 304 and the fixed electrode 308.

Figure 4:
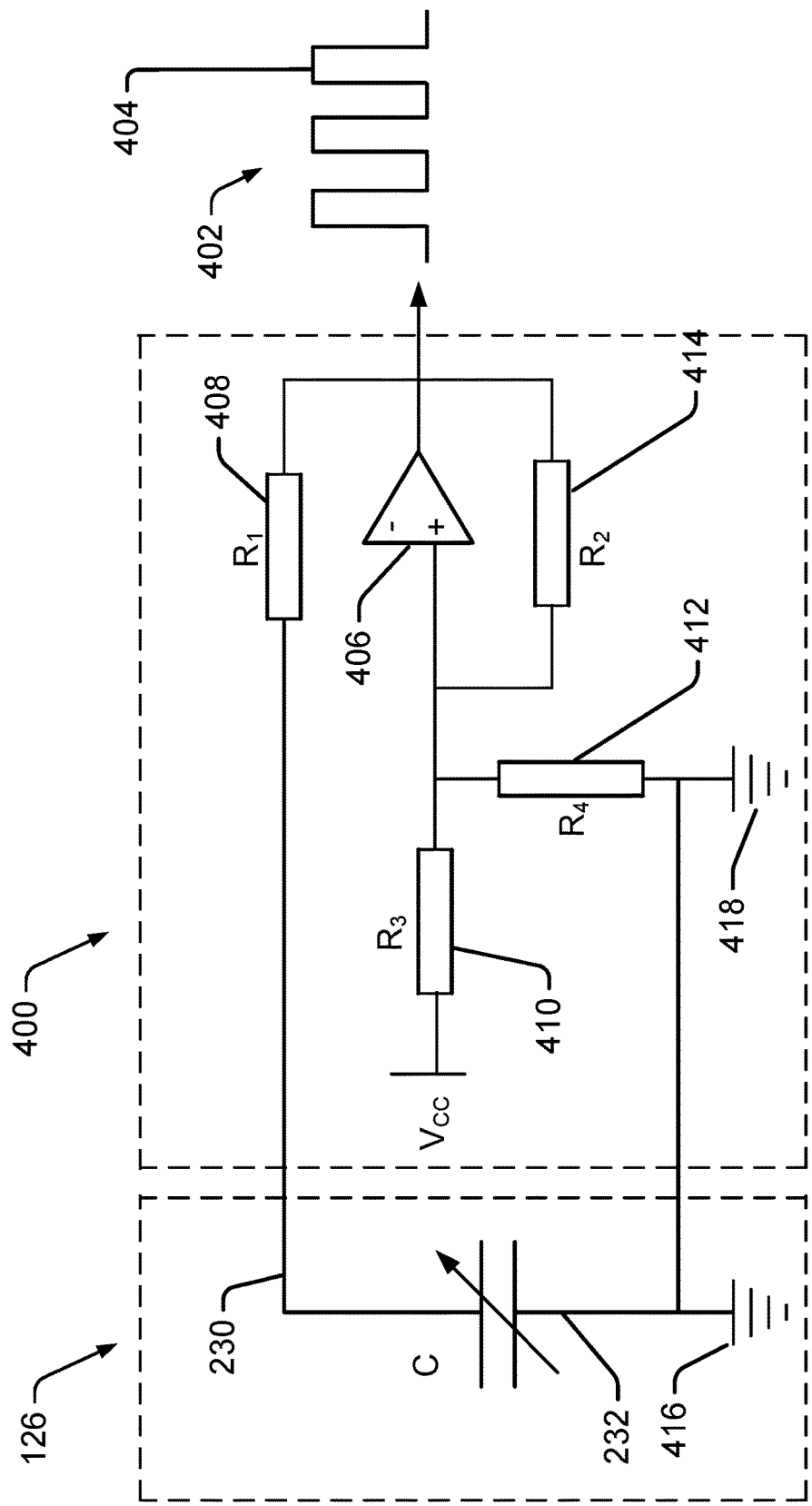
FIG. 4 is a circuit diagram showing an example circuit, wherein a variable capacitor is used to create an output signal.

FIG. 4 shows an example circuit 400 by which an output signal may be created, wherein characteristics of the output signal are based at least in part on the capacitance of the variable capacitor 126. The example circuit 400 is a unipolar astable multivibrator circuit. Other circuits could alternatively be used to produce output signals based on the capacitance of the variable capacitor 126. In a second example, the capacitor may be connected to an astable multivibrator circuit. In a third example, the capacitor may be connected to an oscillator circuit having a frequency that is based at least in part on the capacitance of the capacitor. In a fourth example, the capacitor may be connected to an oscillator circuit having one or more characteristics that are based at least in part on the capacitance of the capacitor. Such characteristics may include an aspect ratio, a frequency, or others. In a fifth example, the capacitor may be connected to any circuit configured to create an output signal having one or more characteristics that are based at least in part on the capacitance of a capacitor of the circuit.

FIG. 4 shows an example circuit 400, which receives a capacitance from the variable capacitor 126 as an input and creates an output signal 402. In an example, a value of the capacitance of the variable capacitor 126 of FIGS. 1-3 is based at least in part on (e.g., is a function of) the pressure of the fluid (e.g., water) in the conduit 200 of the water meter 106. Thus, because the capacitance of the variable capacitor 126 is a function of the water pressure, the frequency of the output signal 402 is also a function of the pressure of the water in the fluid flow 210 passing through the conduit 200 of the water meter 106. By counting signal pulses 404 per unit of time (e.g., per second) of the output signal, a processor (e.g., processor 112 of FIG. 1) may obtain the frequency of the output signal 402. The frequency may be used to determine the pressure of the water flow 210. In an example, the processor may access a lookup table and/or evaluate a function, to obtain a pressure value.

The example circuit 400 is representative of circuits that produce an output signal having characteristics that are based at least in part on the capacitance of the variable capacitor 126. The output signal characteristics do not have to represent the microfarad (uF) or picofarad (pF) value of the variable capacitor at a point of time. Instead, the output characteristic(s) (e.g., frequency) are used by a mapping function that inputs a value of the characteristic and maps that value to water pressure value. Accordingly, the mapping is used to determine a water pressure associated with each output frequency value (or range of frequencies) of the circuit 400. Depending on the specific design characteristic of the circuit used, an appropriate lookup table is designed to map the frequency (or other characteristic) of the output signal to a water pressure value (or range of values).

In the example circuit 400, an operational amplifier 406 and several resistors 408-414 and ground connections 416, 418 are used. The example circuit 400 using operational amplifier 406 provides a specific design, component arrangement, and electrical connections to fully enable the systems, methods and techniques discussed herein. However, in a second and more generalized example, a voltage comparator could be used in a circuit having appropriate connections, components, and design for a particular system. In either implementation, an output signal 402 is created that is a function of the pressure of the fluid flow 210 passing through the conduit 200 of the water meter 106. Depending on the nature of the capacitor, the circuit, and resultant output signal, and/or other factors, an appropriate lookup-table is designed.

Example Methods

In some examples of the techniques discussed herein, the methods of operation may be performed by one or more application specific integrated circuits (ASIC) or may be performed by a general-purpose processor utilizing software defined in computer readable media. In the examples and techniques discussed herein, the memory 114 may comprise computer-readable media and may take the form of volatile memory, such as random-access memory (RAM) and/or non-volatile memory, such as read only memory (ROM) or flash RAM. Computer-readable media devices include volatile and non-volatile, removable, and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

As defined herein, computer-readable media does not include transitory media, such as modulated data signals and carrier waves, and/or signals.

In an example, the processor 112 using instructions obtained from memory device 114 (e.g., pressure-sensing application 120) is configured to perform operations described by FIGS. 5 through 8. The processor 112 can include a microprocessor and memory, an FPGA, and/or one or more integrated circuits, and the instructions can be stored in memory or implemented in hardware circuits.

The computer-readable instructions stored on one or more non-transitory computer-readable storage media, when executed by one or more processors, may perform operations described above with reference to FIGS. 5-8 as described below. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 5:
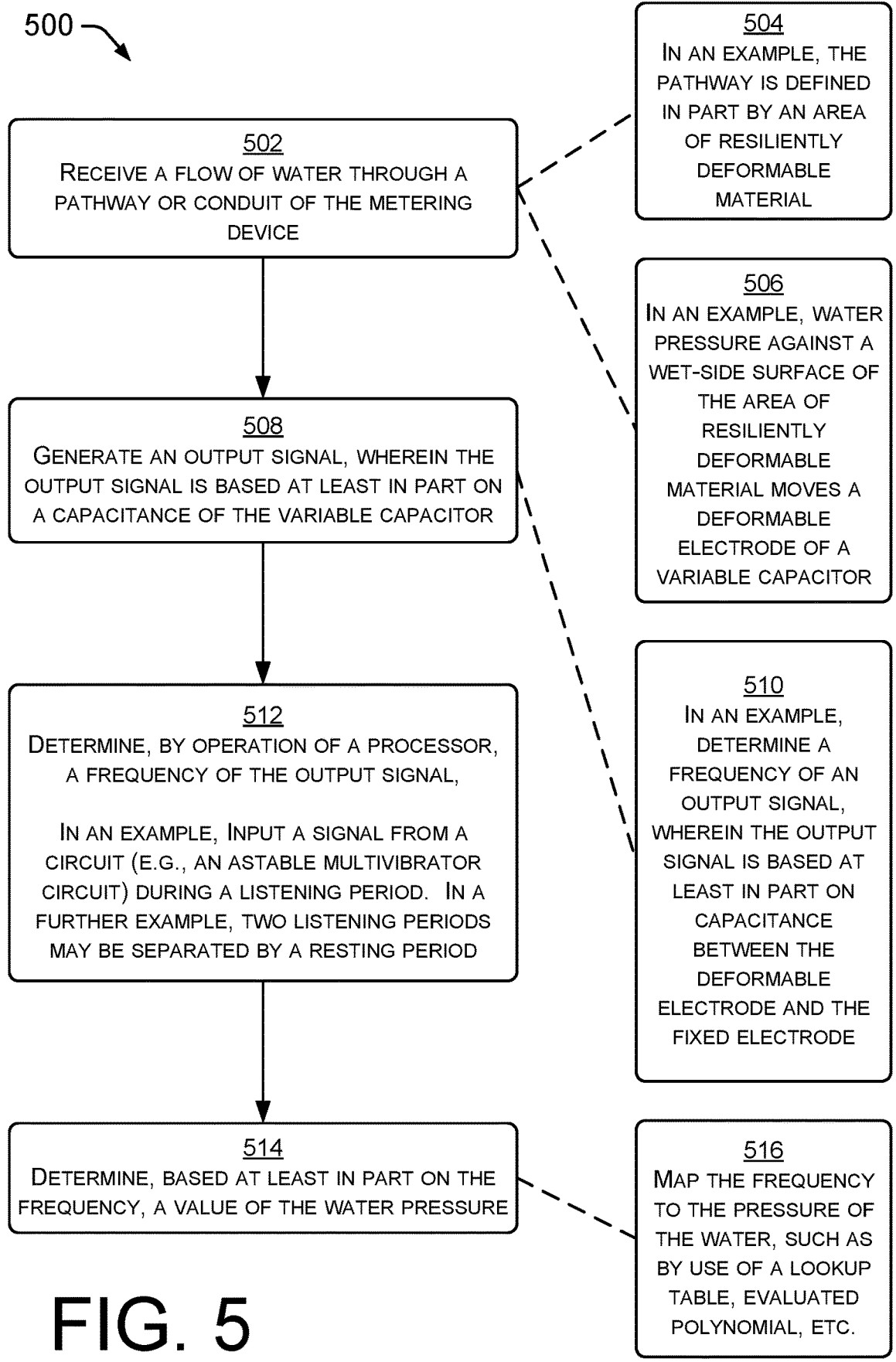
FIG. 5 is a flow diagram showing example operation of a pressure sensor for a metering device.

FIG. 5 shows an example method 500 to operate pressure sensing device(s) of a metering device, such as the metering device 106 of FIG. 1. In one example, the operation may be performed by the processor 112 using instructions of the pressure-sensing application 120 of FIG. 1. In other examples, other devices and/or software objects may be used. Accordingly, FIGS. 5 through 8 shows example methods to operate devices such as those shown in FIGS. 1 through 3A, but are not limited only to operation of such devices.

At block 502, a flow of water is received through a pathway of the metering device. In the example of block 504, the pathway is defined in part by an area of resiliently deformable material. In the example of block 506, water pressure against a wet-side surface of the area of resiliently deformable material moves a deformable electrode of a capacitor with respect to a fixed second electrode. In the example of FIG. 2, the water presses against the area 228 of the conduit that is resiliently deformable. This adjusts the location of the deformable electrode 220 with respect to the fixed electrode 222, thereby adjusting a capacitance of the variable capacitor.

At block 508, an output signal is generated, wherein the output signal is based at least in part on a capacitance of the capacitor. In the example of block 510, a frequency of an output signal is determined. In the example, the output signal is based at least in part on capacitance between the deformable electrode and the fixed electrode. Referring to the example of FIG. 4, the unipolar astable multivibrator circuit 400 produces such an output signal.

At block 512, operation of a processor determines a frequency of the output signal. In the example of FIG. 1, the processor 112 receives as input the output signal from an astable multivibrator circuit during a listening period. The processor 112 determines the frequency of the signal by counting signal pulses over a listening period. In a further example that saves power, two listening periods may be separated by a resting period.

At block 514, a value of the water pressure is determined. The value may be based at least in part on the frequency. In the example of block 516, the frequency is mapped to an associated pressure of the water, such as by use of a lookup table, evaluated formula and/or polynomial, etc. That is, each frequency and/or range of frequencies is mapped to a water pressure and/or range of water pressures. In the example of FIG. 1, the processor 112, having determined the frequency of the output signal, consults the lookup table 122 to determine the pressure associated with the frequency.

FIG. 6 is flow diagram showing example detail of block 508 of FIG. 5. Accordingly, FIG. 6 shows two examples by which an appropriate output signal could be generated, wherein the output signal is based at least in part on a capacitance of the capacitor. In the example of block 600, the output signal may be generated by operation of a unipolar astable multivibrator circuit. In one example, the unipolar astable multivibrator circuit may be constructed in a manner similar to the circuit 400 of FIG. 4. In the example of block 602, a unipolar astable multivibrator circuit receives a first lead from a deformable electrode of the capacitor and a second lead from a fixed-location electrode of the capacitor. In the example, neither of the first lead and second lead passes through the resiliently deformable material. This is advantageous since the possibility of leaks in the conduit and/or area of resiliently deformable material of the conduit is significantly reduced. In the example of FIG. 2, the area 228 of resiliently deformable material allows the water pressure to push against the deformable electrode 220 without allowing water to come into contact with the variable capacitor 126.

Figure 7:
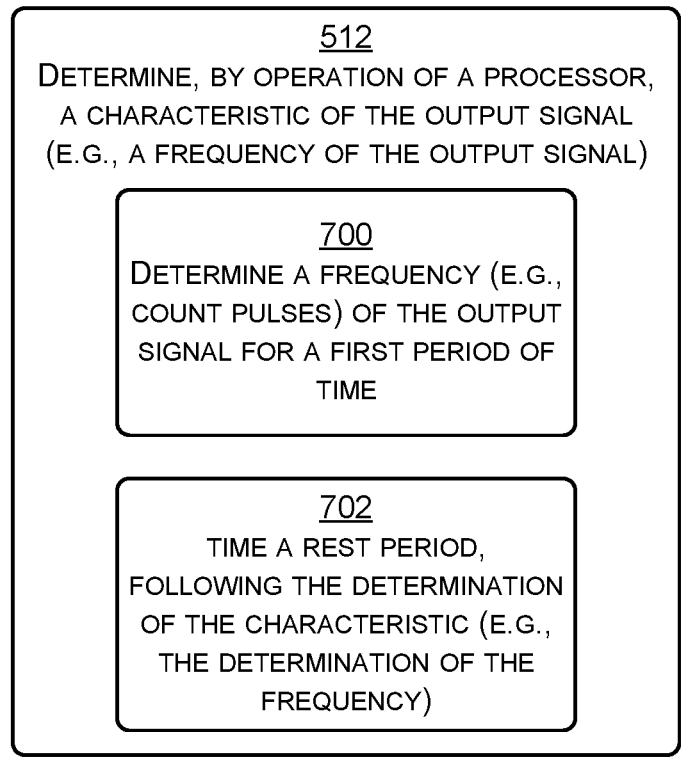

FIG. 7 shows example detail of block 512 of FIG. 5. Accordingly, FIG. 7 shows two examples by which operation of a processor determines a frequency of the output signal generated by a circuit, such as an astable multivibrator circuit that receives input from a variable capacitor. In the example of block 700, the processor counts pulses of the output signal for a first period of time. In examples, the processor may count pulses of the output signal for a fraction of a second, a second, or multiple seconds. In the example of block 702, a rest period may be timed, following the counting of the pulses. In the example, the pressure of the water may be measured periodically, intermittently, at intervals, etc. Periods during which measurements are made may be interleaved with periods during which power is saved.

Figure 8:
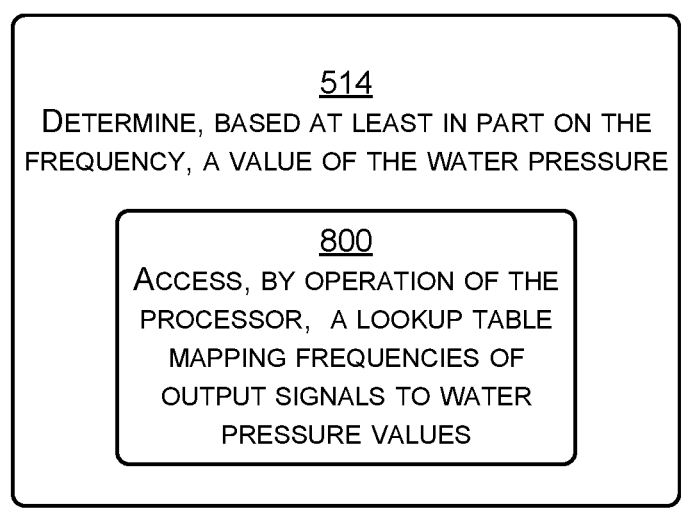

FIG. 8 shows example detail of block 514 of FIG. 5. Accordingly, FIG. 8 shows an example by which a value of the water pressure is determined, based at least in part on the frequency of the output signal. In the example of block 800, a lookup table mapping frequencies of output signals to water pressure values is accessed by the processor. In the example of FIG. 1, the processor 112 maps the frequency of the output signal to a water pressure value using lookup table 122.

Example Systems and Devices

The following examples of a pressure sensor embedded in a metering device are expressed as number clauses. While the examples illustrate a number of possible configurations and techniques, they are not meant to be an exhaustive listing of the systems, methods, and/or techniques described herein.

1. A metering device, comprising: a conduit defining an upstream connector for an upstream transducer and a downstream connector for a downstream transducer, wherein the conduit is made at least in part of a resiliently deformable material; a deformable electrode of a capacitor, wherein the deformable electrode is mounted in contact with a dry-side surface of an area of the resiliently deformable material of the conduit, wherein a wet-side surface of the area of the resiliently deformable material defines part of a pathway for a flow of water, and wherein the area of the resiliently deformable material is configured to change a location and a shape of the deformable electrode in response to changes in water pressure; a fixed electrode of the capacitor, wherein the fixed electrode is separated by a dielectric material from the deformable electrode; and a circuit to determine a pressure of the water based at least in part on a capacitance between the deformable electrode and the fixed electrode. In an example, a water meter has a variable capacitor that is located on a dry-side of a conduit made of resiliently deformable material. No drilling, gaskets and/or O-rings required. Instead, the area of the conduit "flexes" or "deforms" a bit, depending on the water pressure. Changes in water pressure result in a change of capacitance due to movement of an area of resiliently deformable material of the conduit to which an electrode (e.g., a "plate") of a capacitor is attached.

2. The metering device as recited in clause 1, wherein the resiliently deformable material forms a water-tight barrier without a port between the pathway of the flow of the water and the capacitor. In an example, resiliently deformable material of the conduit forms a water-tight barrier between the pathway of the flow of the water and the capacitor. Thus, a hole, gasket, fastener, etc., that might leak (between a wet-side and a dry-side) are not required.

3. The metering device as recited in one or more of the preceding clauses, wherein the capacitance between the deformable electrode and the fixed electrode is variable and based at least in part on characteristics of the resiliently deformable material of the conduit. In an example, the capacitance is a variable capacitance that is based at least in part on water pressure and based at least in part on the shape and the location of the deformable electrode. In other examples, the lookup table will link or map variable capacitance and water pressure.

4. The metering device as recited in one or more of the preceding clauses, additionally comprising: a stationary backing material to support the fixed electrode. In an example feature, the fixed electrode is held in a fixed location while the deformable electrode moves in response to water pressure changes.

5. The metering device as recited in one or more of the preceding clauses, wherein the resiliently deformable material is configured to: move the deformable electrode closer to the fixed electrode as water pressure increases; and move the deformable electrode away from the fixed electrode as water pressure decreases. In an example, the resiliently deformable material is configured to assume a "relaxed" state in lower water pressure that separates the electrodes and results in less capacitance. Higher water pressure stresses the deformable material and increases capacitance as the electrodes (or plates) of the capacitor move closer together. Such configurations could be reversed, with appropriate changes to a mapping function or look-up table.

6. The metering device as recited in one or more of the preceding clauses, wherein the circuit comprises: an astable multivibrator circuit to output an output signal based at least in part on the capacitance; and a processor to receive the output signal and to determine the pressure of the water. In an example, the deformable and fixed electrodes are connected to a circuit, which creates an output having a frequency (or other information transmission means) that is related to the water pressure.

7. The metering device as recited in one or more of the preceding clauses, wherein the circuit comprises: a comparator or operational amplifier connected to at least one electrode of the capacitor to create an output signal, wherein the output signal is based at least in part on capacitance between the deformable electrode and the fixed electrode; and a processor to receive the output signal and to determine the pressure of the water based at least in part on a frequency of the output signal. In an example, such alternative implementations regarding detail of the circuit are possible, and consistent with the concepts expressed herein.

8. The metering device as recited in one or more of the preceding clauses, wherein the circuit comprises: a memory device containing a lookup table; and a processor to receive an output signal based at least in part on capacitance between the deformable electrode and the fixed electrode, to determine a frequency of the output signal, and to determine the pressure of the water using the frequency and the lookup table. In one possible version, a lookup table is used to map or link the capacitance between the deformable and fixed electrodes to a water pressure.

9. The metering device as recited in one or more of the preceding clauses, wherein the circuit comprises a processor and memory device, and wherein instructions on the memory device, when executed by the processor, cause the metering device to perform actions comprising: determining a frequency of an output signal, wherein the output signal is based at least in part on capacitance between the deformable electrode and the fixed electrode; and mapping the frequency to the pressure of the water. In an example, the processor receives a signal, determines the frequency of the signal, and then "maps" (e.g., using a lookup table or evaluation of a polynomial) the frequency to a pressure.

10. The metering device as recited in one or more of the preceding clauses, wherein the circuit comprises a processor and memory device, and wherein instructions on the memory device, when executed by the processor, cause the metering device to perform actions comprising: inputting a signal from an astable multivibrator circuit during a listening period, wherein two listening periods are separated by a resting period; determining a frequency of the signal; and determining the pressure of the water from a lookup table based at least in part on the frequency of the signal. In an example, the processor inputs a signal at intervals (e.g., using a 100 ms listening period), determines the frequency, and then "maps" the frequency to a pressure.

11. A method of operating a metering device, comprising: receiving a flow of water through a pathway of the metering device, where the pathway is defined in part by an area of resiliently deformable material, and wherein water pressure against a wet-side surface of the area of resiliently deformable material moves a deformable electrode of a capacitor; generating an output signal, wherein the output signal is based at least in part on a capacitance of the capacitor; determining, by operation of a processor, a frequency of the output signal; and determining, based at least in part on the frequency, a value of the water pressure. In an example, the circuit and/or processor performs actions that enable the measurement of water pressure.

12. The method of clause 11, wherein determining the value of the water pressure comprises: accessing a lookup table mapping frequencies of output signals to water pressure values. In an example, the processor determines the water pressure using a lookup table mapping frequency to pressure.

13. The method of one or more of the preceding clauses, wherein determining the frequency of the output signal comprises: counting pulses of the output signal for a first period of time; and timing a rest period, following the counting of the pulses. In an example, the pulse-counting by the processor may be alternated with rest periods, to save power.

14. The method of one or more of the preceding clauses, wherein generating the output signal comprises: generating the output signal by operation of a unipolar astable multivibrator circuit. In an example, generating the output signal may be performed by a unipolar astable multivibrator circuit. In other examples, other circuits may be used.

15. The method of one or more of the preceding clauses, wherein generating the output signal comprises: receiving, at a unipolar astable multivibrator circuit, a first lead from a deformable electrode of the capacitor and a second lead from a fixed-location electrode of the capacitor, wherein neither of the first lead and second lead passes through the area of resiliently deformable material. In an example, the capacitor is on the dry side, and there is no hole, gasket, pass-through, fastener, etc., to the wet side.

16. A pressure-sensing device for a metering device, comprising: a deformable electrode of a capacitor, wherein the deformable electrode is mounted in contact with a dry-side surface of an area of a resiliently deformable material, wherein the resiliently deformable material defines at least part of a pathway to contain a flow of water to be measured by the metering device, and wherein the area of the resiliently deformable material is configured to change a location and a shape of the deformable electrode in response to changes in water pressure; a fixed electrode of the capacitor, wherein the fixed electrode is held in a fixed location, and wherein the fixed electrode is separated from the deformable electrode by a dielectric material; and a circuit to determine a pressure of the water based at least in part on a capacitance between the deformable electrode and the fixed electrode. In an example, the pressure-sensing device includes two electrodes and a circuit.

17. The pressure-sensing device of one or more of the preceding clauses, wherein the resiliently deformable material is configured to: move the deformable electrode closer to the fixed electrode as water pressure increases; and move the deformable electrode away from the fixed electrode as water pressure decreases. In an example, as the pressure changes, the capacitance changes.

18. The pressure-sensing device of one or more of the preceding clauses, wherein the dielectric material is configured to allow changes in distances between the deformable electrode and the fixed electrode, while still electrically insulating the deformable electrode from the fixed electrode. In an example, the dielectric material (e.g., air or some resiliently-deformable electrically-insulating material) allows the deformable electrode to move with respect to the fixed electrode in response to water pressure changes.

19. The pressure-sensing device of one or more of the preceding clauses, wherein the resiliently deformable material is configured to change a location and a shape of the deformable electrode in response to changes in water pressure from 30 to 80 psi. In an example, the resiliently deformable material is configured to change a location and/or a shape of the deformable electrode in response to changes in water pressure from 30 to 80 psi (or other range of pressures associated with a water supply system. That is, pressure measurement is possible over at least a pressure range used by a utility company.

20. The pressure-sensing device of one or more of the preceding clauses, wherein the area of the resiliently deformable material comprises: a wet-side surface in contact with the flow of water; a fastening adhesive to connect the deformable electrode to the resiliently deformable material. In an example, an area of resilient deformability of the material includes a wet-side surface in contact with the flow of water and a dry-side surface in contact with the deformable electrode. The resiliently deformable material prevents leaks between the wet-side and the dry-side.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The words comprise, comprises, and/or comprising, when used in this specification and/or claims specify the presence of stated features, devices, techniques, and/or components. The words do not preclude the presence or addition of one or more other features, devices, techniques, and/or components and/or groups thereof.

The invention claimed is:

1. A metering device, comprising:
   a conduit defining an upstream connector for an upstream transducer and a downstream connector for a downstream transducer, wherein the conduit is made at least in part of a resiliently deformable material;
   a deformable electrode of a capacitor, wherein the deformable electrode is mounted in contact with a dry-side surface of an area of the resiliently deformable material of the conduit, wherein a wet-side surface of the area of the resiliently deformable material defines part of a pathway for a flow of water, and wherein the area of the resiliently deformable material is configured to change a location and a shape of the deformable electrode in response to changes in water pressure;
   a fixed electrode of the capacitor, wherein the fixed electrode is separated by a dielectric material from the deformable electrode; and
   a circuit to determine a pressure of the water based at least in part on a capacitance between the deformable electrode and the fixed electrode.

2. The metering device as recited in claim 1, wherein the resiliently deformable material forms a water-tight barrier without a port between the pathway of the flow of the water and the capacitor.

3. The metering device as recited in claim 1, wherein the capacitance between the deformable electrode and the fixed electrode is variable and based at least in part on characteristics of the resiliently deformable material of the conduit.

4. The metering device as recited in claim 1, additionally comprising:
   a stationary backing material to support the fixed electrode.

5. The metering device as recited in claim 1, wherein the resiliently deformable material is configured to:
   move the deformable electrode closer to the fixed electrode as water pressure increases; and
   move the deformable electrode away from the fixed electrode as water pressure decreases.

6. The metering device as recited in claim 1, wherein the circuit comprises:
   an astable multivibrator circuit to output an output signal based at least in part on the capacitance; and
   a processor to receive the output signal and to determine the pressure of the water.

7. The metering device as recited in claim 1, wherein the circuit comprises:
   a comparator or operational amplifier connected to at least one electrode of the capacitor to create an output signal, wherein the output signal is based at least in part on capacitance between the deformable electrode and the fixed electrode; and
   a processor to receive the output signal and to determine the pressure of the water based at least in part on a frequency of the output signal.

8. The metering device as recited in claim 1, wherein the circuit comprises:
   a memory device containing a lookup table; and
   a processor to receive an output signal based at least in part on capacitance between the deformable electrode and the fixed electrode, to determine a frequency of the output signal, and to determine the pressure of the water using the frequency and the lookup table.

9. The metering device as recited in claim 1, wherein the circuit comprises a processor and a memory device, and wherein instructions on the memory device, when executed by the processor, cause the metering device to perform actions comprising:
 determining a frequency of an output signal, wherein the output signal is based at least in part on capacitance between the deformable electrode and the fixed electrode; and
 mapping the frequency to the pressure of the water.

10. The metering device as recited in claim 1, wherein the circuit comprises a processor and memory device, and wherein instructions on the memory device, when executed by the processor, cause the metering device to perform actions comprising:
 inputting a signal from an astable multivibrator circuit during a listening period, wherein two listening periods are separated by a resting period;
 determining a frequency of the signal; and
 determining the pressure of the water from a lookup table based at least in part on the frequency of the signal.

11. A method of operating a metering device, comprising:
 receiving a flow of water through a pathway of the metering device, where the pathway is defined in part by an area of resiliently deformable material, and wherein water pressure against a wet-side surface of the area of resiliently deformable material moves a deformable electrode of a capacitor;
 generating a signal, by operation of a circuit comprising the capacitor, wherein a capacitance of the capacitor is based at least in part on a shape of the deformable electrode of the capacitor, and wherein the signal is based at least in part on a capacitance of the capacitor;
 determining, by operation of a processor, a frequency of the signal;
 determining, based at least in part on the frequency, a value of the water pressure; and
 outputting the value of the water pressure.

12. The method of claim 11, wherein determining the value of the water pressure comprises:
 accessing a lookup table mapping frequencies of output signals to water pressure values.

13. The method of claim 11, wherein determining the frequency of the signal comprises:
 counting pulses of the signal for a first period of time; and
 timing a rest period, following the counting of the pulses.

14. The method of claim 11, wherein generating the signal comprises:
 generating the signal by operation of a unipolar astable multivibrator circuit.

15. The method of claim 11, wherein generating the signal comprises:
 receiving, at a unipolar astable multivibrator circuit, a first lead from the deformable electrode of the capacitor and a second lead from a fixed-location electrode of the capacitor, wherein neither of the first lead and second lead passes through the area of resiliently deformable material.

16. A pressure-sensing device for a metering device, comprising:
 a deformable electrode of a capacitor, wherein the deformable electrode is mounted in contact with a dry-side surface of an area of a resiliently deformable material, wherein the resiliently deformable material defines at least part of a pathway to contain a flow of water to be measured by the metering device, and wherein the area of the resiliently deformable material is configured to change a location and a shape of the deformable electrode in response to changes in water pressure;
 a fixed electrode of the capacitor, wherein the fixed electrode is held in a fixed location, and wherein the fixed electrode is separated from the deformable electrode by a dielectric material; and
 a circuit to determine a pressure of the water based at least in part on a capacitance between the deformable electrode and the fixed electrode.

17. The pressure-sensing device of claim 16, wherein the resiliently deformable material is configured to:
 move the deformable electrode closer to the fixed electrode as water pressure increases; and
 move the deformable electrode away from the fixed electrode as water pressure decreases.

18. The pressure-sensing device of claim 16, wherein the dielectric material is configured to allow changes in distances between the deformable electrode and the fixed electrode, while still electrically insulating the deformable electrode from the fixed electrode.

19. The pressure-sensing device of claim 16, wherein the resiliently deformable material is configured to change the location and the shape of the deformable electrode in response to changes in water pressure from 30 to 80 psi.

20. The pressure-sensing device of claim 16, wherein the area of the resiliently deformable material comprises:
 a wet-side surface in contact with the flow of water; and
 a fastening adhesive to connect the deformable electrode to the resiliently deformable material.

* * * * *